(12) United States Patent
Huang et al.

(10) Patent No.: US 7,848,294 B2
(45) Date of Patent: Dec. 7, 2010

(54) APPARATUS, METHOD AND COMPUTER PROGRAM PRODUCT PROVIDING SIGNALING FOR POWER REUSE

(75) Inventors: Leping Huang, Saitama-ken (JP); Kodo Shu, Kawasaki (JP); Hongyuan Chen, Tokyo (JP); Sari Nielsen, Espoo (FI); Lars Dalsgaard, Oulu (FI); Jarkko Koskela, Oulu (FI)

(73) Assignee: Nokia Corporation, Espoo (FI)

( * ) Notice: Subject to any disclaimer, the term of this patent is extended or adjusted under 35 U.S.C. 154(b) by 692 days.

(21) Appl. No.: 11/977,518

(22) Filed: Oct. 25, 2007

(65) Prior Publication Data

US 2008/0144577 A1    Jun. 19, 2008

Related U.S. Application Data

(60) Provisional application No. 60/855,224, filed on Oct. 30, 2006.

(51) Int. Cl.
*H04W 36/00* (2009.01)

(52) U.S. Cl. .................. 370/331; 370/332; 455/437; 455/522

(58) Field of Classification Search .................. None
See application file for complete search history.

(56) References Cited

U.S. PATENT DOCUMENTS

| | | | |
|---|---|---|---|
| 7,099,384 B1 * | 8/2006 | Jalali et al. ................ | 375/229 |
| 7,383,057 B1 * | 6/2008 | Senarath et al. ............. | 455/522 |
| 2008/0070585 A1 * | 3/2008 | Wu et al. .................. | 455/452.2 |
| 2008/0076407 A1 * | 3/2008 | Shitara ........................ | 455/424 |
| 2008/0188256 A1 * | 8/2008 | Wu et al. ..................... | 455/522 |

FOREIGN PATENT DOCUMENTS

| | | |
|---|---|---|
| EP | 1 694 091 A2 | 8/2006 |
| EP | 1-798 884 A | 6/2007 |
| WO | WO-2006/038694 A | 4/2006 |
| WO | WO-2007/049142 A2 | 5/2007 |
| WO | WO-2007/074373 A2 | 7/2007 |

* cited by examiner

*Primary Examiner*—Pankaj Kumar
*Assistant Examiner*—Robert C Scheibel
(74) *Attorney, Agent, or Firm*—Harrington & Smith

(57) ABSTRACT

In one non-limiting, exemplary embodiment, a method includes: receiving information, by a user equipment, from a first network element of a plurality of network elements, wherein the information is descriptive of a power reuse pattern utilized by the plurality of network elements; identifying, using the received information, at least one frequency sub-band of a plurality of frequency sub-bands, wherein each network element of the plurality of network elements transmits at least one measurement signal in a channel on a frequency sub-band of the plurality of frequency sub-bands, wherein the measurement signals of the plurality of network elements are transmitted with different transmission powers, wherein the identified at least one frequency sub-band corresponds to a second network element of the plurality of network elements; and performing at least one power measurement of the identified at least one frequency sub-band.

15 Claims, 7 Drawing Sheets

TABLE 1 REUSE PATTERN + CELL TYPE MAPPING TABLE
| ID | REUSE PATTERN | ID | REUSE PATTERN |
|---|---|---|---|
| 000 | REUSE-1 | 100 | REUSE-9 |
| 001 | REUSE-3 | 101 | FUTURE USE |
| 010 | REUSE-4 | 110 | FUTURE USE |
| 011 | REUSE-7 | 111 | FUTURE USE |
FIG.1
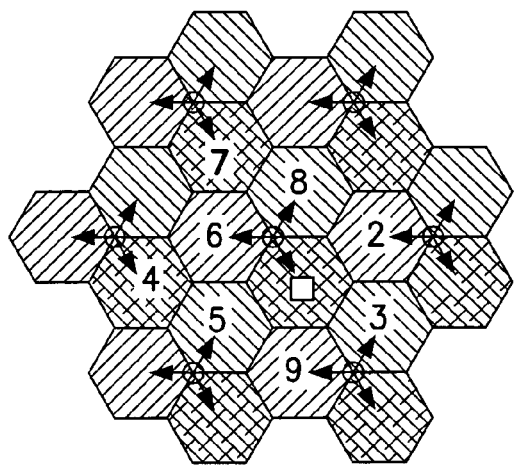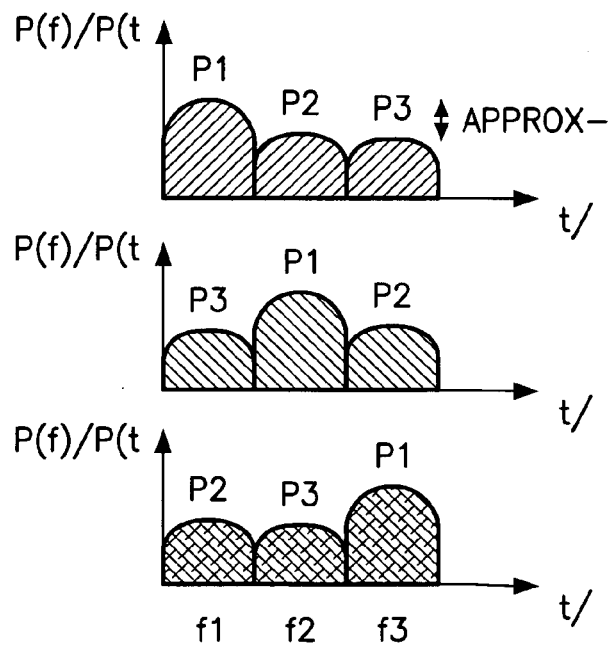
FIG.2

TABLE 2: COMPARISON BETWEEN DIFFERENT SIGNALING SCHEME EMBODIMENTS

| METHOD | INFORMATION SIZE GIVEN N eNBs IN NEIGHBOR LIST(BITS) | COMMENTS |
|---|---|---|
| BASELINE | 216*N | LARGE SIGNALING OVERHEAD |
| 1. REUSE-PATTERN+CELL TYPE | 3+3*N (GIVEN REUSE-7) | MEDIUM SIGNALING OVERHEAD |
| 2. REUSE PATTERN + CAREFUL NETWORK PLANNING | 3 | NETWORK PLANNING CONSIDERATIONS |
| 3. REUSE-PATTERN + UE MEASUREMENT | 3 OR 0 (IF USE EXTENSION) | POTENTIAL OF DELAY IN DETERMINING CELL TYPE, ASSUMES EFFECT OF FAST FADING IS CONSIDERED AND REMOVED |
| 4. OWN CELL INFO ONLY | 3+3 (REUSE PATTERN AND CELLS CELL TYPE) | READING OF NEIGHBOR CELL SYSTEM INFORMATION IS ASSUMED |

APPARATUS, METHOD AND COMPUTER PROGRAM PRODUCT PROVIDING SIGNALING FOR POWER REUSE

CROSS-REFERENCE TO RELATED APPLICATIONS

This patent application claims priority under 35 U.S.C. §119(e) from Provisional Patent Application No. 60/855,224, filed Oct. 30, 2006, the disclosure of which is incorporated by reference herein in its entirety.

TECHNICAL FIELD

The exemplary and non-limiting embodiments of this invention relate generally to wireless communication systems, methods, devices and computer program products and, more specifically, relate to techniques to provide measurements used for, as examples, handover, cell reselection and interference control.

BACKGROUND

Various abbreviations found in the specification are defined as follows:
3GPP third generation partnership project
BW bandwidth
DL downlink (Node B to UE)
DRX discontinuous reception
eNB evolved Node-B
E-UTRAN evolved universal terrestrial radio access network
FDD frequency division duplex
HO handover
IC interference control
L1 layer 1 (physical layer)
LTE long term evolution
Node-B base station
OFDMA orthogonal frequency division multiple access
RAN radio access network
RAT radio access technology
RB resource block
SC-FDMA single carrier-frequency division multiple access
SI system information
SIB system information block
TDD time division duplex
UE user equipment
UL uplink (UE to Node B)
UTRA universal territory radio access
UTRAN universal terrestrial radio access network A proposed communication system known as evolved UTRAN (E-UTRAN, also referred to as UTRAN-LTE or as 3.9G/LTE) is currently under discussion within the 3GPP. The current working assumption is that the DL access technique will be OFDMA, and the UL technique will be SC-FDMA.

E-UTRAN is a packet-data-based transmission system that supports intra-frequency, inter-frequency and inter-RAT handovers (also referred to as serving frequency layer, non-serving frequency layer and inter-RAT handovers). Typically, for supporting mobility the UE periodically measures the power of the pilot channel of different cells. In general, if the measurement results between a current serving cell and a neighboring cell satisfy certain criteria, the UE is handed over to the neighboring cell. One important requirement of pilot measurements for handover and cell reselection purposes is that the measurement results of different cells are comparable.

Interference control is a scheme to improve the cell-edge performance of E-UTRAN, which intends to mitigate the inter-cell interference under a frequency reuse-1 constraint.

As may be appreciated, an ability to make accurate and meaningful measurements is important to achieve reliable HOs.

SUMMARY

In one non-limiting, exemplary embodiment, a method comprises: receiving information, by a user equipment, from a first network element of a plurality of network elements, wherein the information is descriptive of a power reuse pattern utilized by the plurality of network elements; identifying, using the received information, at least one frequency sub-band of a plurality of frequency sub-bands, wherein each network element of the plurality of network elements transmits at least one measurement signal in a channel on a frequency sub-band of the plurality of frequency sub-bands, wherein the measurement signals of the plurality of network elements are transmitted with different transmission powers, wherein the identified at least one frequency sub-band corresponds to a second network element of the plurality of network elements; and performing at least one power measurement of the identified at least one frequency sub-band.

In another non-limiting, exemplary embodiment, an apparatus, comprising: a receiver configured to receive information from a first network element of a plurality of network elements, wherein the information is descriptive of a power reuse pattern utilized by the plurality of network elements; and a data processor configured to identify, using the received information, at least one frequency sub-band of a plurality of frequency sub-bands, wherein each network element of the plurality of network elements transmits at least one measurement signal in a channel on a frequency sub-band of the plurality of frequency sub-bands, wherein the measurement signals of the plurality of network elements are transmitted with different transmission powers, wherein the identified at least one frequency sub-band corresponds to a second network element of the plurality of network elements, wherein the data processor is further configured to perform at least one power measurement of the identified at least one frequency sub-band.

In another non-limiting, exemplary embodiment, a method comprising: measuring, by a user equipment, reception powers for a plurality of frequency sub-bands corresponding to a plurality of network elements, wherein each network element of the plurality of network elements transmits at least one measurement signal in a channel on a frequency sub-band of the plurality of frequency sub-bands, wherein the measurement signals of the plurality of network elements are transmitted with different transmission powers; determining, using the measured reception powers, a power reuse pattern utilized by the plurality of network elements and at least one frequency sub-band of the plurality of frequency sub-bands, wherein the determined at least one frequency sub-band corresponds to a network element; and performing at least one power measurement of the determined at least one frequency sub-band.

In another non-limiting, exemplary embodiment, an apparatus comprising: a data processor configured to measure reception powers for a plurality of frequency sub-bands corresponding to a plurality of network elements, wherein each network element of the plurality of network elements transmits at least one measurement signal in a channel on a frequency sub-band of the plurality of frequency sub-bands, wherein the measurement signals of the plurality of network elements are transmitted with different transmission powers; and a memory configured to store the measured reception powers, wherein the data processor is further configured to determine, using the measured reception powers, a power reuse pattern utilized by the plurality of network elements and at least one frequency sub-band of the plurality of frequency sub-bands, wherein the determined at least one frequency sub-band corresponds to a network element, wherein the data processor is further configured to perform at least one power measurement of the determined at least one frequency sub-band.

In another non-limiting, exemplary embodiment, a method comprising: receiving first information, by a user equipment, from a first network element of a plurality of network elements, wherein the first information is descriptive of a power reuse pattern utilized by the plurality of network elements; receiving second information, by the user equipment, from a second network element of the plurality of network elements, wherein the second information is descriptive of a cell type of the second network element, wherein each network element of the plurality of network elements transmits at least one measurement signal in a channel on a frequency sub-band of a plurality of frequency sub-bands, wherein the measurement signals of the plurality of network elements are transmitted with different transmission powers; and performing, based on the power reuse pattern and the cell type of the second network element, at least one measurement of a power of at least one frequency sub-band corresponding to the second network element.

In another non-limiting, exemplary embodiment, a method comprising: transmitting a message comprising information descriptive of a power reuse pattern in use by a plurality of network elements; and transmitting a measurement signal in a channel on a frequency sub-band in accordance with the power reuse pattern, wherein each network element of the plurality of network elements transmits at least one measurement signal in a channel on a frequency sub-band of a plurality of frequency sub-bands, wherein the measurement signals of the plurality of network elements are transmitted with different transmission powers.

In another non-limiting, exemplary embodiment, a computer program product comprising program instructions embodied on a tangible computer-readable medium, execution of the program instructions resulting in operations comprising: transmitting a message comprising information descriptive of a power reuse pattern in use by a plurality of network elements; and transmitting a measurement signal in a channel on a frequency sub-band in accordance with the power reuse pattern, wherein each network element of the plurality of network elements transmits at least one measurement signal in a channel on a frequency sub-band of a plurality of frequency sub-bands, wherein the measurement signals of the plurality of network elements are transmitted with different transmission powers.

In another non-limiting, exemplary embodiment, an apparatus, comprising: a transmitter configured to transmit a message comprising information descriptive of a power reuse pattern in use by a plurality of network elements; and a processor coupled to the transmitter, wherein the transmitter is further configured to transmit a measurement signal in a channel on a frequency sub-band in accordance with the power reuse pattern, wherein each network element of the plurality of network elements transmits at least one measurement signal in a channel on a frequency sub-band of a plurality of frequency sub-bands, wherein the measurement signals of the plurality of network elements are transmitted with different transmission powers.

In another non-limiting, exemplary embodiment, an apparatus, comprising: first means for transmitting a message comprising information descriptive of a power reuse pattern in use by a plurality of network elements; and second means for transmitting a measurement signal in a channel on a frequency sub-band in accordance with the power reuse pattern, wherein each network element of the plurality of network elements transmits at least one measurement signal in a channel on a frequency sub-band of a plurality of frequency sub-bands, wherein the measurement signals of the plurality of network elements are transmitted with different transmission powers.

BRIEF DESCRIPTION OF THE DRAWINGS

The foregoing and other aspects of exemplary embodiments of this invention are made more evident in the following Detailed Description, when read in conjunction with the attached Drawing Figures, wherein:

FIG. 1 illustrates a first Table showing a ruse pattern plus cell type mapping;

FIG. 2 is an illustration of an exemplary reuse-3 network;

FIG. 3 illustrates a second Table that shows a comparison between different approaches of signaling in accordance with exemplary embodiments of this invention;

DETAILED DESCRIPTION

The exemplary embodiments of this invention relate to wireless communication systems, such as E-UTRAN, and address the signaling between a network node and a mobile device to accomplish mobile device measurements related at least to handovers, cell reselections and interference control.

While the exemplary embodiments are described below in the context of the E-UTRAN (UTRAN-LTE) system, it should be appreciated that the exemplary embodiments of this invention are not limited for use with only this one particular type of wireless communication system, and that they may be used to advantage in other wireless communication systems.

The exemplary embodiments of this invention assume, but do not require, that a LTE RAN uses one type of interference control scheme characterized by soft frequency reuse with fixed resource allocations and power levels. Note that soft frequency reuse IC is generally a popular IC scheme in 3GPP. The exemplary embodiments of this invention further make a non-limiting assumption that a power sequence is applied on DL shared data channels and on L1 pilot channels. As a result, pilot symbols in different frequency sub-bands are transmitted with different power.

One publication of interest to the ensuing description of the exemplary embodiments of this invention is 3GPP TS 25.331, V7.1.0 (2006-06), "3rd Generation Partnership Project; Technical Specification Group Radio Access Network; Radio Resource Control (RRC); Protocol Specification (Release 7)."

Figure 4:
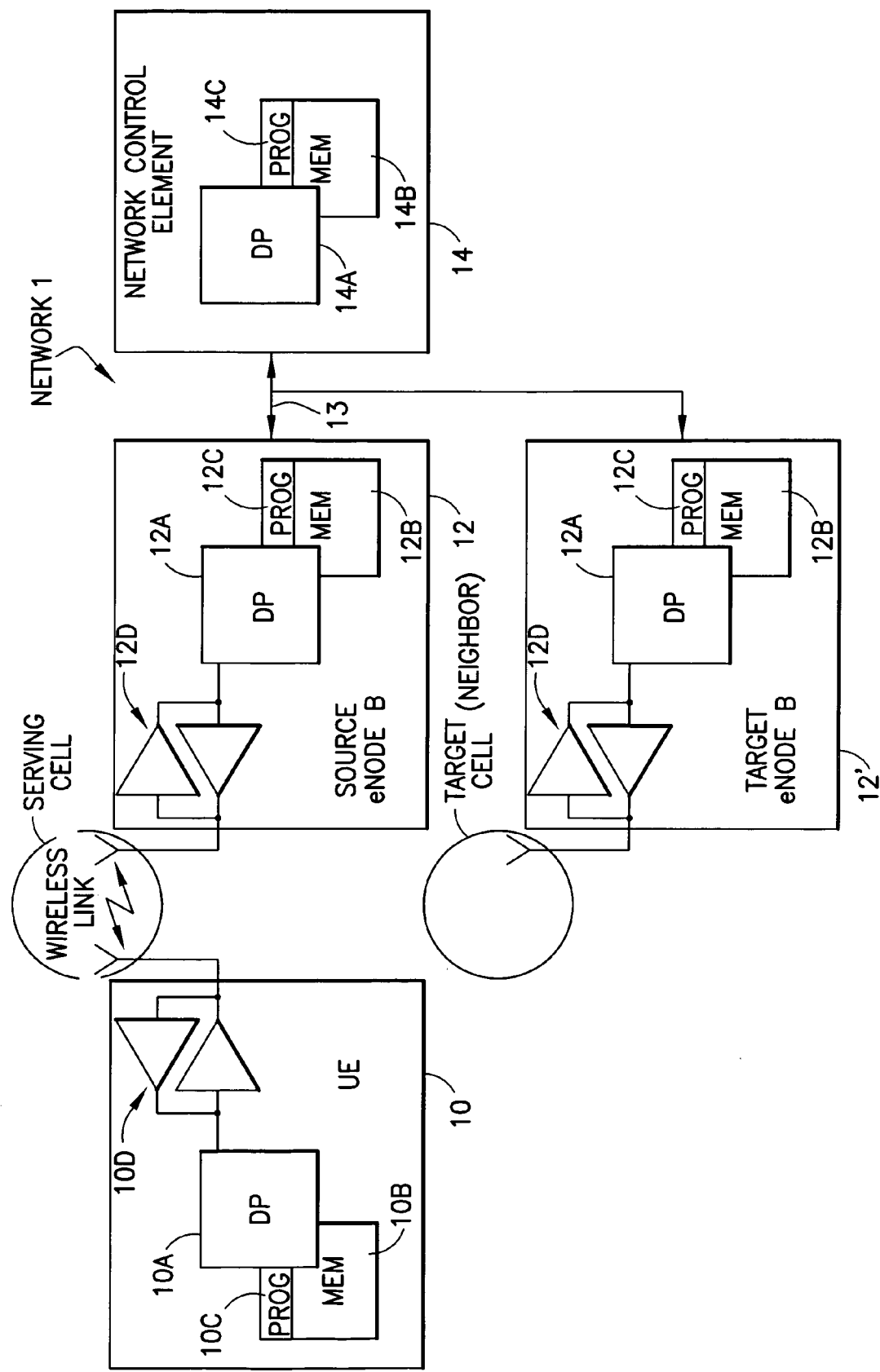
FIG. 4 shows a simplified block diagram of various electronic devices that are suitable for use in practicing the exemplary embodiments of this invention.

Before describing in detail the exemplary embodiments of this invention, reference is made first to FIG. 4 for illustrating a simplified block diagram of various electronic devices that are suitable for use in practicing the exemplary embodiments of this invention. In FIG. 4, a wireless network 1 is adapted for communication with a UE 10 via at least one Node B (base station) 12 (also referred to herein as an eNode B 12 or as an eNB 12). The network 1 may include a network control element 14 coupled to the eNode B 12 via a data link 13. The UE 10 includes a data processor (DP) 10A, a memory (MEM) 10B that stores a program (PROG) 10C, and a suitable radio frequency (RF) transceiver 10D for bidirectional wireless communications with the eNode B 12, which also includes a DP 12A, a MEM 12B that stores a PROG 12C, and a suitable RF transceiver 12D. The eNode B 12 is typically coupled via the data path 13 to the network control element 14 that also includes at least one DP 14A and a MEM 14B storing an associated PROG 14C. At least one of the PROGs 10C and 12C is assumed to include program instructions that, when executed by the associated DP, enable the electronic device to operate in accordance with the exemplary embodiments of this invention, as will be discussed below in greater detail.

Shown for completeness in FIG. 4 is at least one second (neighbor) eNode B, referred to as 12'. During a HO event the eNode B 12 may be considered the Source eNode B, i.e., the eNode B to which the UE 10 is currently connected and communicating in the associated serving cell, and the eNode B 12' may be considered the Target eNode B, i.e., the eNode B to which the UE 10 is to be connected and communicating with in the target cell after the HO procedure is completed. Note that in practice the serving cell and the target cell with at least partially overlap one another. The transmission of the neighbor eNode-B 12' is what is measured by the UE 10 prior to a HO event.

In general, the various embodiments of the UE 10 can include, but are not limited to, mobile phones, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

The inventors have observed that when a base station transmits with different powers on different pilot and/or data sub carriers, the arithmetic average of the received pilot power over the full bandwidth (e.g., 10 MHz) is not necessarily accurate or entirely suitable to estimate the channel quality over the entire operating BW. This is due at least to the fact that there will in general be more weight/bias on those sub-bands having a higher Tx Power.

The exemplary embodiments of this invention operate to overcome this and other limitations.

The inventors note that one might assume that the UE 10 knows a priori the power sequence of all neighboring cells. However, in the current UTRAN/E-UTRAN definition no signaling has been proposed to support a notification of the power sequence(s) (difference of transmitting power between sub-carriers/sub-bands over the transmission bandwidth) to the UE 10. As a result, the exemplary embodiments of this invention address this deficiency by providing a plurality of signaling schemes to notify the UE 10 of the power sequence of a neighboring cell(s) for at least assisting the UE 10 in determining proper measurement algorithms (e.g., which frequency band to measure). In a given deployment one or more of the signaling schemes may be employed.

The exemplary embodiments of this invention thus provide several types of signaling. An objective of the first three signaling schemes described below is to efficiently notify the UE 10 of the power sequence of the serving and neighboring cells via a serving cell's broadcast signaling, such as a neighboring cell list signal, for example. A fourth signaling scheme provides the power sequence of a cell to a UE via that cell's system information (SI).

In a first signaling scheme, referred to for convenience, and not as a limitation, as a reuse-pattern plus cell type, the signaling contains: (1) a reuse-pattern identification (id) of the network; and (2) the cell types of each eNB 12. In that, in a practical sense, only part of the reuse pattern (reuse-1/3/4/7/9) is possible, a mapping table is employed between the reuse pattern id and the reuse pattern.

In a second signaling scheme, referred to for convenience, and not as a limitation, as a reuse pattern plus careful network planning, the signaling contains only the reuse pattern id of the network. In accordance with system planning, from the eNB 12 id the UE 10 is enabled to derive the cell type of the associated eNB.

In a third signaling scheme, referred to for convenience, and not as a limitation, as a reuse pattern plus UE measurement, the signaling contains only reuse pattern id, and the UE 10 derives the cell type by measurement of the reception power of different sub-bands.

In addition, the third approach can be extended such that the UE 10 measures the entire cell BW, but does not average the measurements in frequency over the entire measured BW. Instead, averaging is performed on each sub-band (minimum radio block BW) level in frequency and in time. Averaging over time provides an indication of the power profiles used for the sub-band. This approach leads to the third signaling scheme if the sub-bands are chosen as having the minimum radio block BW. This extended approach does not require any signaling if the UE 10 procedures and behavior are explicitly defined in the specifications.

The benefit of these methods of the third approach is that they require a very limited amount of signaling, or no signaling at all. These procedures assume that the UE 10 should make some decisions on the actual deployment based on its own measurements. Measurement-based detection (as opposed to explicit signaling) may increase the probability of false detection and thus result in the introduction of some uncertainty. However, this may be seen as acceptable due to the significant savings in required signaling BW and system information parameters.

A fourth signaling scheme, referred to for convenience, and not as a limitation, as a short system information approach, operates such that instead of broadcasting information in the serving cell for the power sequence of both the serving and neighboring cells (i.e., the reuse pattern), each cell broadcasts its cell power sequence by itself. This information may be added into the short system information broadcast in the center 1.25 MHz of BW. The UE 10 can then determine the power sequence of the neighboring cell by reading the neighboring cell broadcast short system information. A benefit of this approach is that there is no need to add this information into the neighboring cell list information. The use of this approach implies that UE 10 needs to read the system information parameters from each identified neighbor cell that it attempts to measure, which may tend to increase UE 10 power consumption when the UE 10 utilizes DRX. Additionally, the reading operation may introduce some delay into the measurement(s). However, the use of this approach can be particularly attractive if the total size of messages to convey a network's IC configuration increases significantly and/or if the number of neighbor cells is large.

One may conclude that the reuse pattern plus cell type scheme (the first signaling scheme referenced above) is advantageous when the number of E-UTRA neighbor cells is small, and that the short system information approach (the fourth signaling scheme referenced above) is advantageous when the number of E-UTRA neighbor cells is large. Both of these signaling schemes can reliably inform the UE 10 of the sub-band to measure. Furthermore, one may employ the reuse pattern plus network planning scheme (the second signaling scheme referred to above) and the reuse-pattern plus UE measurement scheme (the third signaling scheme referred to above) so as to provide signaling optimization if the signaling overhead become a critical factor.

Assume for comparison purposes only a baseline approach exemplified by:

A) information from eNB 12 to UE 10—eNB12 includes the following information in its neighbor list, and sends this information to the UEs 10 in the cell via a SIB: {eNB_id, (RB#0, power_offset), (RB#1, power_offset) . . . , (RB#24, power_offset)};

B) estimation of information size per neighbor eNB—RB id: 5 bits (24 RBs in total); power_offset: 4 bits (−8 db~8 db), Size=24*(5 bits+4 bits)=216 bits, and given 32 eNBs in the neighbor list, a total of 216 bits*32=6912 bits; and C) cost—large overhead on the SIB, where the overhead is proportional to the number of eNBs 12 present in the neighbor list.

Discussing now in greater detail the first signaling scheme (reuse pattern plus cell type), and since only the following reuse pattern is feasible in practice: Reuse-1/3/4/7/9, a 3-bit reuse pattern id (supporting up to eight different reuse patterns) is used to map the different reuse patterns. For example, assume the use of the mapping table as shown in FIG. 1. The signaling contains: (1) the reuse pattern id of the network and (2) the cell types of each eNB 12. Given a Reuse-pattern 7 (3-bit), additional information to send in the neighbor list may include: (1) Reuse pattern: three per list; and (2) cell type: 3-bits (in reuse-7 scenario) per eNB 12 in the list.

Given N (e.g., 32) eNBs, the total of the additional info in neighbor list is simply 3+3*N=3+(3 bits*32)=99 bits. The cell-type indicates the frequency sub-band that the UE 10 should use for measuring a given neighboring cell.

As one non-limiting example of a determination of which sub-band to measure, the UE 10 may use an approach similar to the exemplary implementations described in U.S. patent application No. 60/854,800, filed Oct. 27, 2006. Reference is also made to FIG. 2 as a non-limiting example of a reuse-3 network.

Discussing now the second signaling scheme (reuse pattern plus network planning), it may be appreciated that based on the first signaling scheme at least two possible extensions exist. In the second signaling scheme one may avoid transmission of the cell type by carefully planning the network to include cell type information in the eNB id (sector id). In this case the signaling only contains the reuse pattern id (3-bits) of the network 1. Additional information that may be included in the neighboring list is the reuse pattern: e.g., 3-bits per list. Given N (e.g., 32) eNBs 12, the total additional information in the neighbor list is simply three bits.

As a non-limiting example, the UE 10 derives the cell type by use of the expression:

Cell Type=eNB id (mod M), where M equals the reuse pattern number.

An advantage of the use of this second signaling scheme is the reduced amount of information that needs to be signaled to the UE 10 (constant to the number of eNBs 12 in neighbor list).

Discussing now the third signaling scheme (reuse pattern plus UE measurement), it is noted that this scheme avoids the transmission of the cell type by comparing the measurement results on different sub-bands. The signaling contains only the reuse pattern id (e.g., 3-bits) of the network 1. Additional information to be included in neighboring list is the reuse pattern: 3-bits per list.

The UE 10 in this case derives the cell type by measuring the received power of different sub-bands of one eNB 12. The measurement may take some time in order to remove an effect of fast fading and thus improve the result accuracy. Given the example of the reuse-3 network as shown in FIG. 2, the UE 10 measures three sub-bands f1,f2,f3 of eNB-1. In so doing assume that the UE 10 detects that Power(f3)<Power(f2) and that the Power(f3)<Power(f1), and thus the UE 10 concludes that eNB 1 belongs to cell type 1.

An advantage of this approach is the small amount of information that needs to be signaled (constant to number of eNBs 12 in neighbor list).

An alternative embodiment of the third signaling scheme is based on the use of only UE 10 measurements. While similar to the basic approach of the third signaling scheme embodiment, a basic difference is that no reuse pattern is given to the UE 10, and the measurement blocks in frequency would be lowest RB size as defined in the network 1. From the measurements, and averaging these over time, the UE 10 is enabled to deduce the same information as in the third signaling scheme as described above. Note that the use of this alternative embodiment saves three signaling bits (assuming the same reuse pattern over a wide area).

Discussing now the fourth signaling scheme (only the cell type of the serving cell is broadcast in the static SIB), in this embodiment the reuse pattern may be given in the system information (e.g., using three bits), and the cell type for neighbor cells is not broadcast in the serving cell's neighbor cell information. Instead the cell type of each cell is included in the static part of that cell's system information.

An advantage that is realized by the use of this fourth signaling scheme embodiment is that the UE 10 obtains the same very detailed information as in solution 1, but with a reduced amount of broadcast parameters. As the reuse pattern may be assumed to be rather similar over a large cell area, the reuse pattern may be broadcast in the SIB, and a particular cell's own cell type is broadcast within the cell. In this manner there are no links between cells concerning broadcast information. To implement this embodiment the UE 10 is expected to read system information from neighbor cells in order to perform the measurements. This information may be scheduled in the static (short SI) SI of the cell.

Table 2 in FIG. 3 provides a comparison between the different embodiments of the signaling schemes detailed above.

As may be appreciated, the exemplary embodiments of this invention provide a practical solution for the signaling to support UE 10 measurements when a static IC scheme is used in the LTE RAN, and the second and third signaling embodiments provide optimizations to reduce the overhead of the signaling.

Based on the foregoing it should be apparent that the exemplary embodiments of this invention provide a method, an apparatus, a device and computer program product(s) to enable a network element, such as the eNB 12, to specify via DL signaling to a UE those sub-bands in which to make a measurement. In a first embodiment the signaling contains: (1) a reuse-pattern identification (id) of the network; and (2) the cell types of each eNB 12, and a mapping table is employed between the reuse pattern id and the reuse pattern. In a second embodiment the signaling contains: a reuse pattern identification of the network. In accordance with system planning, from the eNB 12 identification the UE 10 is enabled to derive the cell type of the associated eNB. In a third embodiment the signaling contains: only a reuse pattern identification based on which the UE 10 determines the cell type by measurements of the reception power of different sub-bands. In this embodiment the UE 10 may perform averaging on each sub-band measured power level in frequency and in time, where the averaging over time provides an indication of the power profiles used for the sub-band. In a fourth embodiment the signaling contains: the serving cell power sequence that is received in a broadcast (e.g. short system information) transmission, and the UE 10 determines the power sequence of neighboring cells by reading the corresponding broadcast short system information from neighboring cells.

Based on the foregoing it should be apparent that the exemplary embodiments of this invention also provide a method, an apparatus, a device and computer program product(s) to enable a UE to receive from a network element, such as the eNB, information that specifies those sub-bands in which the UE is to make a measurement, and making measurements in the specified sub-bands, in accordance with one or more of the foregoing four signaling schemes, and variations thereof.

Below are described various non-limiting exemplary embodiments of the invention. While numbered for purposes of clarity, said numbering should not be construed as wholly separating the various embodiments as one or more aspects of one exemplary embodiment may be utilized in conjunction with one or more other aspects of another exemplary embodiment, as suitable.

Figure 5:
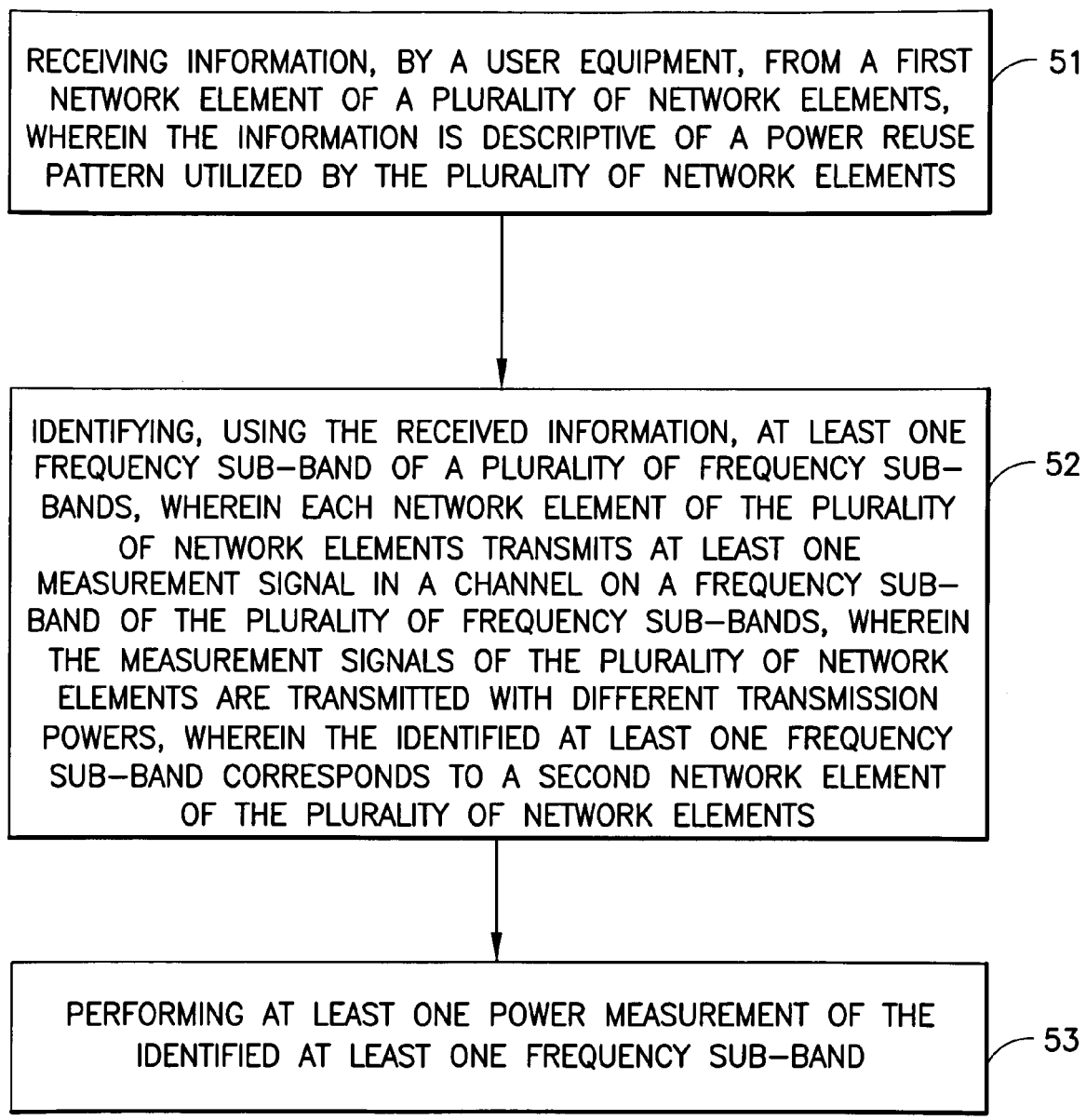
FIG. 5 depicts a flowchart illustrating one non-limiting example of a method for practicing the exemplary embodiments of this invention.

(1) In one non-limiting, exemplary embodiment, and as shown in FIG. 5, a method comprises: receiving information, by a user equipment, from a first network element of a plurality of network elements, wherein the information is descriptive of a power reuse pattern utilized by the plurality of network elements (box 51); identifying, using the received information, at least one frequency sub-band of a plurality of frequency sub-bands, wherein each network element of the plurality of network elements transmits at least one measurement signal in a channel on a frequency sub-band of the plurality of frequency sub-bands, wherein the measurement signals of the plurality of network elements are transmitted with different transmission powers, wherein the identified at least one frequency sub-band corresponds to a second network element of the plurality of network elements (box 52); and performing at least one power measurement of the identified at least one frequency sub-band (box 53).

A method as above, wherein the received information is further descriptive of the at least one frequency sub-band corresponding to the second network element. A method as in the previous, wherein the information comprises a power reuse pattern identification that is descriptive of the power reuse pattern utilized by the plurality of network elements, the method further comprising: utilizing a mapping to obtain a corresponding power reuse pattern from the power reuse pattern identification. A method as in any above, wherein identifying the at least one frequency sub-band corresponding to the second network element comprises utilizing system planning to determine the at least one frequency sub-band based on the power reuse pattern. A method as in the previous, wherein a second network element identification (NE2 id) comprises cell type information descriptive of the at least one frequency sub-band corresponding to the second network element. A method as in the previous, wherein the information comprises a power reuse pattern identification that is descriptive of the power reuse pattern utilized by the plurality of network elements, the method further comprising: deriving the cell type information using the expression: Cell Type Information=NE2 id (mod M), where M is the power reuse pattern identification.

A method as in any above, further comprising: measuring a reception power of a plurality of second frequency sub-bands, wherein identifying the at least one frequency sub-band corresponding to the second network element comprises utilizing the plurality of measured reception powers. A method as in the previous, further comprising: performing averaging on each second frequency sub-band in frequency and time. A method as in any above, wherein the information is received via a broadcast signal transmitted by the first network element. A method as in the previous, wherein the broadcast signal comprises a neighboring cell list. A method as in any above, wherein the first network element comprises a first base station and wherein the second network element comprises a second base station. A method as in any above, wherein the method comprises a static interference control scheme characterized by soft reuse with fixed resource allocations and fixed power levels. A method as in any above, wherein the plurality of network elements and the user equipment comprise components of an evolved universal terrestrial radio access network. A method as in any above, wherein the method is implemented by a computer program. A method as in any above, wherein the method is implemented by a computer program executable by a processor of a user equipment.

(2) In another non-limiting, exemplary embodiment, a computer program product comprising program instructions embodied on a tangible computer-readable medium, execution of the program instructions resulting in operations comprising: receiving information, by a user equipment, from a first network element of a plurality of network elements, wherein the information is descriptive of a power reuse pattern utilized by the plurality of network elements; identifying, using the received information, at least one frequency sub-band of a plurality of frequency sub-bands, wherein each network element of the plurality of network elements transmits at least one measurement signal in a channel on a frequency sub-band of the plurality of frequency sub-bands, wherein the measurement signals of the plurality of network elements are transmitted with different transmission powers, wherein the identified at least one frequency sub-band corresponds to a second network element of the plurality of network elements; and performing at least one power measurement of the identified at least one frequency sub-band.

A computer program product as above, wherein the received information is further descriptive of the at least one frequency sub-band corresponding to the second network element. A computer program product as in the previous, wherein the information comprises a power reuse pattern identification that is descriptive of the power reuse pattern utilized by the plurality of network elements, execution of the program instructions resulting in operations further comprising: utilizing a mapping to obtain a corresponding power reuse pattern from the power reuse pattern identification. A computer program product as in any above, wherein identifying the at least one frequency sub-band corresponding to the second network element comprises utilizing system planning to determine the at least one frequency sub-band based on the power reuse pattern. A computer program product as in the previous, wherein a second network element identification (NE2 id) comprises cell type information descriptive of the at least one frequency sub-band corresponding to the second network element. A computer program product as in the previous, wherein the information comprises a power reuse pattern identification that is descriptive of the power reuse pattern utilized by the plurality of network elements, execution of the program instructions resulting in operations further comprising: deriving the cell type information using the expression: Cell Type Information=NE2 id (mod M), where M is the power reuse pattern identification.

A computer program product as in any above, execution of the program instructions resulting in operations further comprising: measuring a reception power of a plurality of second frequency sub-bands, wherein identifying the at least one frequency sub-band corresponding to the second network element comprises utilizing the plurality of measured reception powers. A computer program product as in the previous, execution of the program instructions resulting in operations further comprising: performing averaging on each second frequency sub-band in frequency and time. A computer program product as in any above, wherein the information is received via a broadcast signal transmitted by the first network element. A computer program product as in the previous, wherein the broadcast signal comprises a neighboring cell list. A computer program product as in any above, wherein the first network element comprises a first base station and wherein the second network element comprises a second base station. A computer program product as in any above, wherein the execution of the program instructions implements a static interference control scheme characterized by soft reuse with fixed resource allocations and fixed power levels. A computer program product as in any above, wherein the plurality of network elements and the user equipment comprise components of an evolved universal terrestrial radio access network.

(3) In another non-limiting, exemplary embodiment, an apparatus, comprising: a receiver configured to receive information from a first network element of a plurality of network elements, wherein the information is descriptive of a power reuse pattern utilized by the plurality of network elements; and a data processor configured to identify, using the received information, at least one frequency sub-band of a plurality of frequency sub-bands, wherein each network element of the plurality of network elements transmits at least one measurement signal in a channel on a frequency sub-band of the plurality of frequency sub-bands, wherein the measurement signals of the plurality of network elements are transmitted with different transmission powers, wherein the identified at least one frequency sub-band corresponds to a second network element of the plurality of network elements, wherein the data processor is further configured to perform at least one power measurement of the identified at least one frequency sub-band.

An apparatus as above, wherein the received information is further descriptive of the at least one frequency sub-band corresponding to the second network element. An apparatus as in the previous, wherein the information comprises a power reuse pattern identification that is descriptive of the power reuse pattern utilized by the plurality of network elements, wherein the data processor is further configured to utilize a mapping to obtain a corresponding power reuse pattern from the power reuse pattern identification. An apparatus as in any above, wherein identifying the at least one frequency sub-band corresponding to the second network element comprises utilizing system planning to determine the at least one frequency sub-band based on the power reuse pattern. An apparatus as in the previous, wherein a second network element identification (NE2 id) comprises cell type information descriptive of the at least one frequency sub-band corresponding to the second network element. An apparatus as in the previous, wherein the information comprises a power reuse pattern identification that is descriptive of the power reuse pattern utilized by the plurality of network elements, wherein the data processor is further configured to derive the cell type information using the expression: Cell Type Information=NE2 id (mod M), where M is the frequency reuse pattern identification.

An apparatus as in any above, wherein the data processor is further configured to measure a reception power of a plurality of second frequency sub-bands, wherein identifying the at least one frequency sub-band corresponding to the second network element comprises utilizing the plurality of measured reception powers. An apparatus as in the previous, wherein the data processor is further configured to perform averaging on each second frequency sub-band in frequency and time. An apparatus as in any above, wherein the information is received via a broadcast signal transmitted by the first network element. An apparatus as in the previous, wherein the broadcast signal comprises a neighboring cell list. An apparatus as in any above, wherein the apparatus comprises a user equipment. An apparatus as in any above, wherein the apparatus implements a static interference control scheme characterized by soft reuse with fixed resource allocations and fixed power levels. An apparatus as in any above, wherein the plurality of network elements and the apparatus comprise components of an evolved universal terrestrial radio access network.

(4) In another non-limiting, exemplary embodiment, an apparatus, comprising: receiving means for receiving information from a first network element of a plurality of network elements, wherein the information is descriptive of a power reuse pattern utilized by the plurality of network elements; identification means for identifying, using the received information, at least one frequency sub-band of a plurality of frequency sub-bands, wherein each network element of the plurality of network elements transmits at least one measurement signal in a channel on a frequency sub-band of the plurality of frequency sub-bands, wherein the measurement signals of the plurality of network elements are transmitted with different transmission powers, wherein the identified at least one frequency sub-band corresponds to a second network element of the plurality of network elements; and measuring means for performing at least one power measurement of the identified at least one frequency sub-band.

An apparatus as above, wherein the receiving means comprises a receiver, wherein the identification means and the measuring means comprise a data processor. An apparatus as in any above, wherein the received information is further descriptive of the at least one frequency sub-band corresponding to the second network element. An apparatus as in any above, wherein identifying the at least one frequency sub-band corresponding to the second network element comprises utilizing system planning to determine the at least one frequency sub-band based on the power reuse pattern. An apparatus as in any above, wherein the measuring means is further for measuring a reception power of a plurality of second frequency sub-bands, wherein identifying the at least one frequency sub-band corresponding to the second network element comprises utilizing the plurality of measured reception powers. An apparatus as in any above, wherein the measuring means for performing at least one measurement is for measuring a transmission power of a measurement signal transmitted on the identified at least one frequency sub-band by the second network element. An apparatus as in any above, wherein the apparatus comprises a user equipment.

Figure 6:
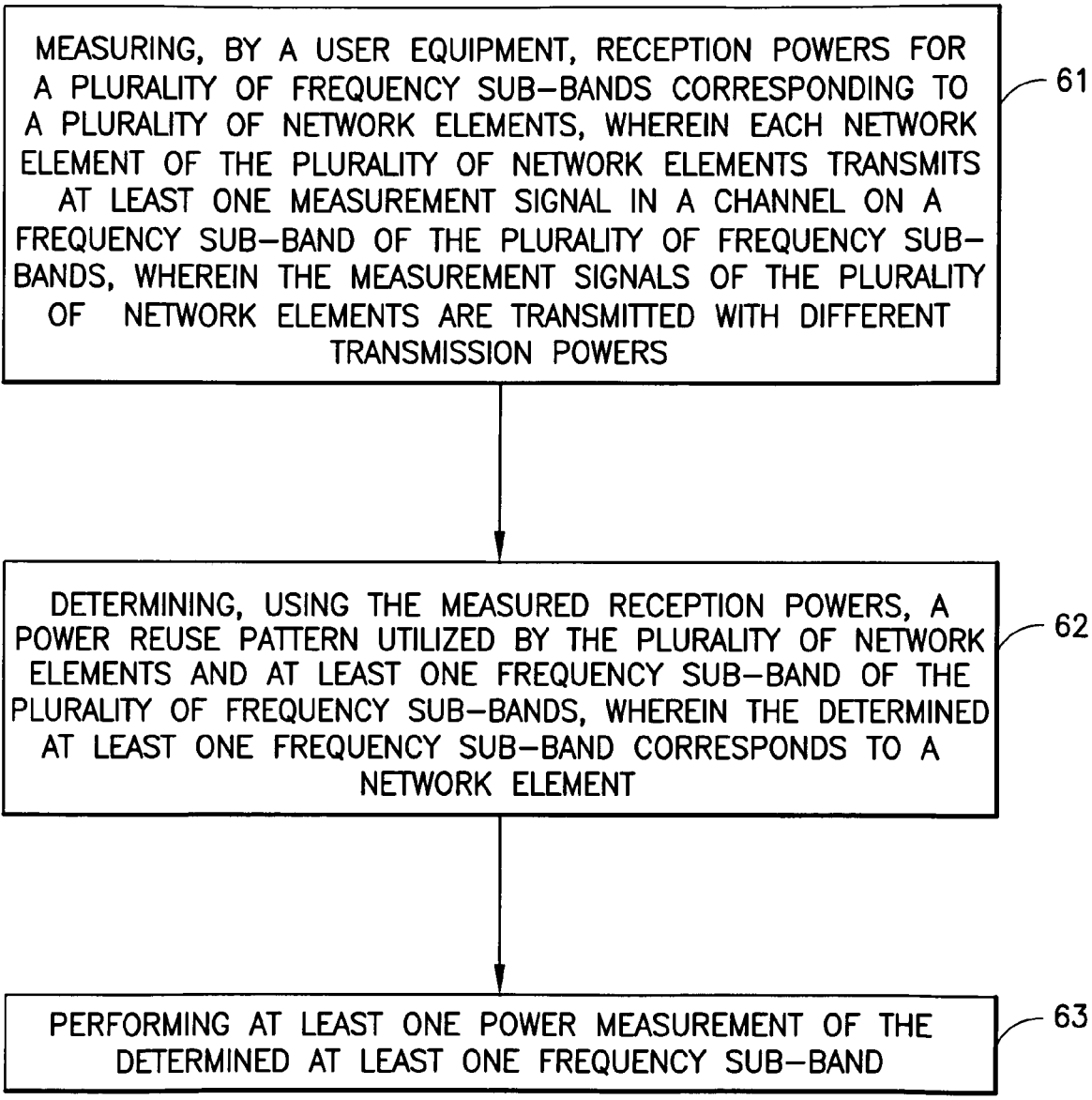
FIG. 6 shows a flowchart illustrating another non-limiting example of a method for practicing the exemplary embodiments of this invention.

(5) In another non-limiting, exemplary embodiment, and as shown in FIG. 6, a method comprising: measuring, by a user equipment, reception powers for a plurality of frequency sub-bands corresponding to a plurality of network elements, wherein each network element of the plurality of network elements transmits at least one measurement signal in a channel on a frequency sub-band of the plurality of frequency sub-bands, wherein the measurement signals of the plurality of network elements are transmitted with different transmission powers (box 61); determining, using the measured reception powers, a power reuse pattern utilized by the plurality of network elements and at least one frequency sub-band of the plurality of frequency sub-bands, wherein the determined at least one frequency sub-band corresponds to a network element (box 62); and performing at least one power measurement of the determined at least one frequency sub-band (box 63).

A method as above, wherein measuring reception powers comprises measuring frequency measurement blocks of a lowest resource block size. A method as in the previous, wherein the user equipment and the network element comprise components of a communications network, wherein the lowest resource block size is defined by the communications network. A method as in any above, wherein performing at least one measurement comprises measuring a transmission power of a measurement signal transmitted on the identified at least one frequency sub-band by the second network element. A method as in any above, wherein the network element comprises a base station. A method as in any above, wherein the method comprises a static interference control scheme characterized by soft reuse with fixed resource allocations and fixed power levels. A method as in any above, wherein the plurality of network elements and the user equipment comprise components of an evolved universal terrestrial radio access network. A method as in any above, wherein the method is implemented by a computer program. A method as in any above, wherein the method is implemented by a computer program executable by a processor of a user equipment.

(6) In another non-limiting, exemplary embodiment, a computer program product comprising program instructions embodied on a tangible computer-readable medium, execution of the program instructions resulting in operations comprising: measuring, by a user equipment, reception powers for a plurality of frequency sub-bands corresponding to a plurality of network elements, wherein each network element of the plurality of network elements transmits at least one measurement signal in a channel on a frequency sub-band of the plurality of frequency sub-bands, wherein the measurement signals of the plurality of network elements are transmitted with different transmission powers; determining, using the measured reception powers, a power reuse pattern utilized by the plurality of network elements and at least one frequency sub-band of the plurality of frequency sub-bands, wherein the determined at least one frequency sub-band corresponds to the network element; and performing at least one power measurement of the determined at least one frequency sub-band.

A computer program product as above, wherein measuring reception powers comprises measuring frequency measurement blocks of a lowest resource block size. A computer program product as in the previous, wherein the user equipment and the network element comprise components of a communications network, wherein the lowest resource block size is defined by the communications network. A computer program product as in any above, wherein performing at least one measurement comprises measuring a transmission power of a measurement signal transmitted on the identified at least one frequency sub-band by the second network element. A computer program product as in any above, wherein the network element comprises a base station. A computer program product as in any above, wherein execution of the program instructions implements a static interference control scheme characterized by soft reuse with fixed resource allocations and fixed power levels. A computer program product as in any above, wherein the plurality of network elements and the user equipment comprise components of an evolved universal terrestrial radio access network.

(7) In another non-limiting, exemplary embodiment, an apparatus comprising: a data processor configured to measure reception powers for a plurality of frequency sub-bands corresponding to a plurality of network elements, wherein each network element of the plurality of network elements transmits at least one measurement signal in a channel on a frequency sub-band of the plurality of frequency sub-bands, wherein the measurement signals of the plurality of network elements are transmitted with different transmission powers; and a memory configured to store the measured reception powers, wherein the data processor is further configured to determine, using the measured reception powers, a power reuse pattern utilized by the plurality of network elements and at least one frequency sub-band of the plurality of frequency sub-bands, wherein the determined at least one frequency sub-band corresponds to a network element, wherein the data processor is further configured to perform at least one power measurement of the determined at least one frequency sub-band.

An apparatus as above, wherein measuring reception powers comprises measuring frequency measurement blocks of a lowest resource block size. An apparatus as in the previous, wherein the electronic device and the network element comprise components of a communications network, wherein the lowest resource block size is defined by the communications network. An apparatus as in any above, wherein performing at least one measurement comprises measuring a transmission power of a measurement signal transmitted on the identified at least one frequency sub-band by the second network element. An apparatus as in any above, wherein the network element comprises a base station. An apparatus as in any above, wherein electronic device is configured to implement a static interference control scheme characterized by soft reuse with fixed resource allocations and fixed power levels. An apparatus as in any above, wherein the plurality of network elements and the electronic device comprise components of an evolved universal terrestrial radio access network. An apparatus as in any above, wherein the apparatus comprises a user equipment.

(8) In another non-limiting, exemplary embodiment, an apparatus comprising: first measuring means for measuring reception powers for a plurality of frequency sub-bands corresponding to a plurality of network elements, wherein each network element of the plurality of network elements transmits at least one measurement signal in a channel on a frequency sub-band of the plurality of frequency sub-bands, wherein the measurement signals of the plurality of network elements are transmitted with different transmission powers; storage means for storing the measured reception powers; processing means for determining, using the measured reception powers, a power reuse pattern utilized by the plurality of network elements and at least one frequency sub-band of the plurality of frequency sub-bands, wherein the determined at least one frequency sub-band corresponds to a network element; and second measuring means for measuring a power of the determined at least one frequency sub-band.

An apparatus as above, wherein the storage means comprises a memory, wherein the first measuring means, the processing means and the second measuring means comprise a data processor. An apparatus as in any above, wherein the apparatus comprises a user equipment.

Figure 7:
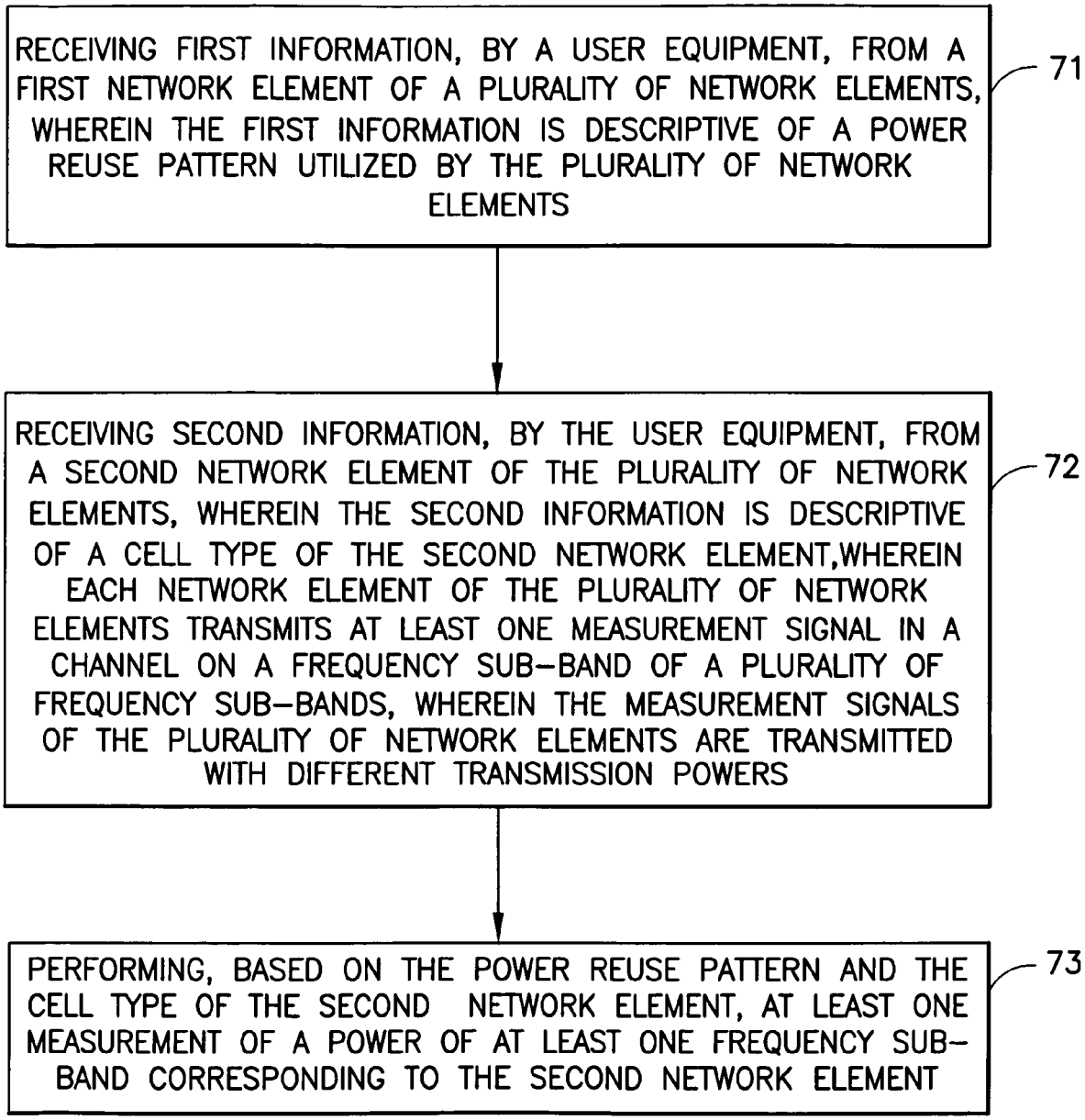
FIG. 7 shows a flowchart illustrating another non-limiting example of a method for practicing the exemplary embodiments of this invention.

(9) In another non-limiting, exemplary embodiment, and as shown in FIG. 7, a method comprising: receiving first information, by a user equipment, from a first network element of a plurality of network elements, wherein the first information is descriptive of a power reuse pattern utilized by the plurality of network elements (box 71); receiving second information, by the user equipment, from a second network element of the plurality of network elements, wherein the second information is descriptive of a cell type of the second network element, wherein each network element of the plurality of network elements transmits at least one measurement signal in a channel on a frequency sub-band of a plurality of frequency sub-bands, wherein the measurement signals of the plurality of network elements are transmitted with different transmission powers (box 72); and performing, based on the power reuse pattern and the cell type of the second network element, at least one measurement of a power of at least one frequency sub-band corresponding to the second network element (box 73).

A method as above, wherein first system information comprises the first information, wherein a static part of second system information comprises the second information. A method as in any above, wherein performing at least one measurement comprises measuring a transmission power of a measurement signal transmitted on the identified at least one frequency sub-band by the second network element. A method as in any above, wherein the first network element comprises a first base station, wherein the second network element comprises a second base station. A method as in any above, wherein the method comprises a static interference control scheme characterized by soft reuse with fixed resource allocations and fixed power levels. A method as in any above, wherein the plurality of network elements and the user equipment comprise components of an evolved universal terrestrial radio access network. A method as in any above, wherein the method is implemented by a computer program. A method as in any above, wherein the method is implemented by a computer program executable by a processor of a user equipment.

(10) In another non-limiting, exemplary embodiment, a computer program product comprising program instructions embodied on a tangible computer-readable medium, execution of the program instructions resulting in operations comprising: receiving first information, by a user equipment, from a first network element of a plurality of network elements, wherein the first information is descriptive of a power reuse pattern utilized by the plurality of network elements; receiving second information, by the user equipment, from a second network element of the plurality of network elements, wherein the second information is descriptive of a cell type of the second network element, wherein each network element of the plurality of network elements transmits at least one measurement signal in a channel on a frequency sub-band of a plurality of frequency sub-bands, wherein the measurement signals of the plurality of network elements are transmitted with different transmission powers; and performing, based on the power reuse pattern and the cell type of the second network element, at least one measurement of a power of at least one frequency sub-band corresponding to the second network element.

A computer program product as above, wherein first system information comprises the first information, wherein a static part of second system information comprises the second information. A computer program product as in any above, wherein performing at least one measurement comprises measuring a transmission power of a measurement signal transmitted on the identified at least one frequency sub-band by the second network element. A computer program product as in any above, wherein the first network element comprises a first base station, wherein the second network element comprises a second base station. A computer program product as in any above, wherein execution of the program instructions implements a static interference control scheme characterized by soft reuse with fixed resource allocations and fixed power levels. A computer program product as in any above, wherein the plurality of network elements and the user equipment comprise components of an evolved universal terrestrial radio access network.

(11) In another non-limiting, exemplary embodiment, an apparatus comprising: a receiver configured to receive first information from a first network element of a plurality of network elements and to receive second information from a second network element of the plurality of network elements, wherein the first information is descriptive of a power reuse pattern utilized by the plurality of network elements, wherein the second information is descriptive of a cell type of the second network element, wherein each network element of the plurality of network elements transmits at least one measurement signal in a channel on a frequency sub-band of a plurality of frequency sub-bands, wherein the measurement signals of the plurality of network elements are transmitted with different transmission powers; and a data processor configured to perform, based on the power reuse pattern and the cell type of the second network element, at least one measurement of a power of at least one frequency sub-band corresponding to the second network element.

An apparatus as above, wherein first system information comprises the first information, wherein a static part of second system information comprises the second information. An apparatus as in any above, wherein performing at least one measurement comprises measuring a transmission power of a measurement signal transmitted on the identified at least one frequency sub-band by the second network element. An apparatus as in any above, wherein the first network element comprises a first base station, wherein the second network element comprises a second base station. An apparatus as in any above, wherein the electronic device is configured to implement a static interference control scheme characterized by soft reuse with fixed resource allocations and fixed power levels. An apparatus as in any above, wherein the plurality of network elements and the apparatus comprise components of an evolved universal terrestrial radio access network. An apparatus as in any above, wherein the apparatus comprises a user equipment.

(12) In another non-limiting, exemplary embodiment, an apparatus comprising: receiving means for receiving first information from a first network element of a plurality of network elements and for receiving second information from a second network element of the plurality of network elements, wherein the first information is descriptive of a power reuse pattern utilized by the plurality of network elements, wherein the second information is descriptive of a cell type of the second network element, wherein each network element of the plurality of network elements transmits at least one measurement signal in a channel on a frequency sub-band of a plurality of frequency sub-bands, wherein the measurement signals of the plurality of network elements are transmitted with different transmission powers; and measuring means for performing, based on the power reuse pattern and the cell type of the second network element, at least one measurement of a power of at least one frequency sub-band corresponding to the second network element.

An apparatus as above, wherein the receiving means comprises a receiver, wherein the measuring means comprises a data processor. An apparatus as in any above, wherein the apparatus comprises a user equipment.

Figure 8:
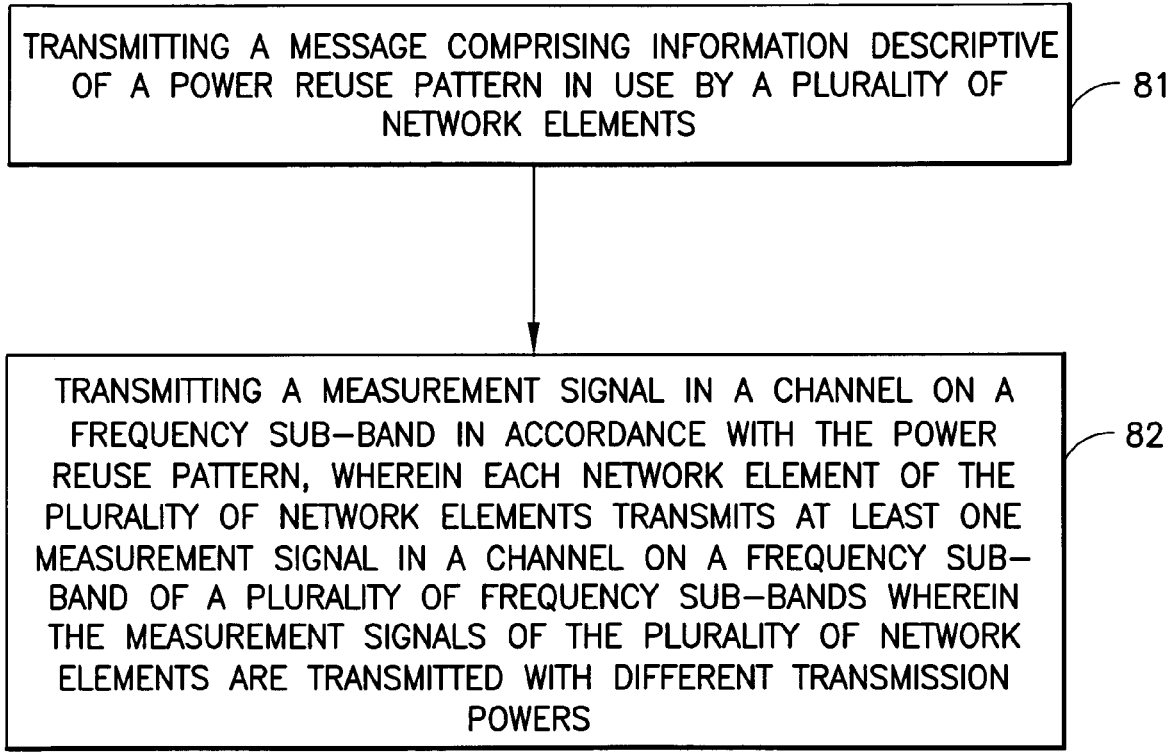
FIG. 8 shows a flowchart illustrating another non-limiting example of a method for practicing the exemplary embodiments of this invention.

(13) In another non-limiting, exemplary embodiment, and as shown in FIG. 8, a method comprising: transmitting a message comprising information descriptive of a power reuse pattern in use by a plurality of network elements (box 81); and transmitting a measurement signal in a channel on a frequency sub-band in accordance with the power reuse pattern (box 82), wherein each network element of the plurality of network elements transmits at least one measurement signal in a channel on a frequency sub-band of a plurality of frequency sub-bands, wherein the measurement signals of the plurality of network elements are transmitted with different transmission powers.

A method as above, wherein the message further comprises second information indicative of a corresponding cell type for the power reuse pattern. A method as in any above, wherein the information comprises a power reuse pattern identification that is descriptive of the power reuse pattern utilized by the plurality of network elements. A method as in any above, wherein a cell type for the reuse pattern and a reuse pattern number satisfy the equation: Cell Type=eNB id (mod M), where M equals the reuse pattern number. A method as in any above, wherein the message further comprises second information indicative of a corresponding cell type for each of at least two network elements of the plurality of network elements, wherein the cell types are for the power reuse pattern. A method as in any above, further comprising: transmitting a sector identification comprising a cell type for the power reuse pattern.

A method as in any above, wherein the message comprises a neighbor list. A method as in any above, wherein the message comprises a broadcast transmission. A method as in any above, further comprising: transmitting a second message comprising second information indicative of a cell type for the power reuse pattern. A method as in the previous, wherein the second message comprises a broadcast transmission. A method as in the previous, wherein the second message comprises short system information. A method as in any above, wherein the method is implemented by a network element of an evolved universal terrestrial radio access network. A method as in any above, wherein the method is implemented by a computer program. A method as in any above, wherein the method is implemented by a computer program executable by a processor of a network element.

(14) In another non-limiting, exemplary embodiment, a computer program product comprising program instructions embodied on a tangible computer-readable medium, execution of the program instructions resulting in operations comprising: transmitting a message comprising information descriptive of a power reuse pattern in use by a plurality of network elements; and transmitting a measurement signal in a channel on a frequency sub-band in accordance with the power reuse pattern, wherein each network element of the plurality of network elements transmits at least one measurement signal in a channel on a frequency sub-band of a plurality of frequency sub-bands, wherein the measurement signals of the plurality of network elements are transmitted with different transmission powers.

A computer program product as above, wherein the message further comprises second information indicative of a corresponding cell type for the power reuse pattern. A computer program product as in any above, wherein the information comprises a power reuse pattern identification that is descriptive of the power reuse pattern utilized by the plurality of network elements. A computer program product as in any above, wherein a cell type for the reuse pattern and a reuse pattern number satisfy the equation: Cell Type=eNB id (mod M), where M equals the reuse pattern number. A computer program product as in any above, wherein the message further comprises second information indicative of a corresponding cell type for each of at least two network elements of the plurality of network elements, wherein the cell types are for the power reuse pattern. A computer program product as in any above, wherein execution of the program instructions results in operations further comprising: transmitting a sector identification comprising a cell type for the power reuse pattern.

A computer program product as in any above, wherein the message comprises a neighbor list. A computer program product as in any above, wherein the message comprises a broadcast transmission. A computer program product as in any above, wherein execution of the program instructions results in operations further comprising: transmitting a second message comprising second information indicative of a cell type for the power reuse pattern. A computer program product as in the previous, wherein the second message comprises a broadcast transmission. A computer program product as in the previous, wherein the second message comprises short system information. A computer program product as in any above, wherein the program instructions of the computer program product are executed by a network element of an evolved universal terrestrial radio access network.

(15) In another non-limiting, exemplary embodiment, an apparatus, comprising: a transmitter configured to transmit a message comprising information descriptive of a power reuse pattern in use by a plurality of network elements; and a processor coupled to the transmitter, wherein the transmitter is further configured to transmit a measurement signal in a channel on a frequency sub-band in accordance with the power reuse pattern, wherein each network element of the plurality of network elements transmits at least one measurement signal in a channel on a frequency sub-band of a plurality of frequency sub-bands, wherein the measurement signals of the plurality of network elements are transmitted with different transmission powers.

An apparatus as above, wherein the message further comprises second information indicative of a corresponding cell type for the power reuse pattern. An apparatus as in any above, wherein the information comprises a power reuse pattern identification that is descriptive of the power reuse pattern utilized by the plurality of network elements. An apparatus as in any above, wherein a cell type for the reuse pattern and a reuse pattern number satisfy the equation: Cell Type=eNB id (mod M), where M equals the reuse pattern number. An apparatus as in any above, wherein the message further comprises second information indicative of a corresponding cell type for each of at least two network elements of the plurality of network elements, wherein the cell types are for the power reuse pattern. An apparatus as in any above, wherein the transmitter is further configured to transmit a sector identification comprising a cell type for the power reuse pattern.

An apparatus as in any above, wherein the message comprises a neighbor list. An apparatus as in any above, wherein the message comprises a broadcast transmission. An apparatus as in any above, wherein the transmitter is further configured to transmit a second message comprising second information indicative of a cell type for the power reuse pattern. An apparatus as in the previous, wherein the second message comprises a broadcast transmission. An apparatus as in the previous, wherein the second message comprises short system information. An apparatus as in any above, further comprising a receiver configured to receive a transmission from a user equipment. An apparatus as in any above, wherein the received transmission comprises a measurement report. An apparatus as in any above, further comprising a memory configured to store the information descriptive of the power reuse pattern. An apparatus as in any above, wherein the apparatus comprises a network element. An apparatus as in any above, wherein the apparatus comprises a component of an evolved universal terrestrial radio access network.

(16) In another non-limiting, exemplary embodiment, an apparatus, comprising: first means for transmitting a message comprising information descriptive of a power reuse pattern in use by a plurality of network elements; and second means for transmitting a measurement signal in a channel on a frequency sub-band in accordance with the power reuse pattern, wherein each network element of the plurality of network elements transmits at least one measurement signal in a channel on a frequency sub-band of a plurality of frequency sub-bands, wherein the measurement signals of the plurality of network elements are transmitted with different transmission powers.

An apparatus as above, wherein the message further comprises second information indicative of a corresponding cell type for the power reuse pattern. An apparatus as in any above, wherein the information comprises a power reuse pattern identification that is descriptive of the power reuse pattern utilized by the plurality of network elements. An apparatus as in any above, wherein a cell type for the reuse pattern and a reuse pattern number satisfy the equation: Cell Type=eNB id (mod M), where M equals the reuse pattern number. An apparatus as in any above, wherein the message further comprises second information indicative of a corresponding cell type for each of at least two network elements of the plurality of network elements, wherein the cell types are for the power reuse pattern. An apparatus as in any above, further comprising third means for transmitting a sector identification comprising a cell type for the power reuse pattern. An apparatus as in any above, wherein the message comprises a neighbor list. An apparatus as in any above, wherein the message comprises a broadcast transmission.

An apparatus as in any above, further comprising third means for transmitting a second message comprising second information indicative of a cell type for the power reuse pattern. An apparatus as in the previous, wherein the second message comprises a broadcast transmission. An apparatus as in the previous, wherein the second message comprises short system information. An apparatus as in any above, further comprising means for receiving a transmission from a user equipment. An apparatus as in any above, wherein the received transmission comprises a measurement report. An apparatus as in any above, wherein the means for receiving comprises a receiver. An apparatus as in any above, further comprising means for storing the information descriptive of the power reuse pattern. An apparatus as in any above, wherein the means for storing comprises a memory. An apparatus as in any above, wherein the apparatus comprises a network element. An apparatus as in any above, further comprising processing means coupled to the first means for transmitting and the second means for transmitting. An apparatus as in any above, wherein the apparatus comprises a component of an evolved universal terrestrial radio access network. An apparatus as in any above, wherein the first means for transmitting and the second means for transmitting comprise a transmitter.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

It is noted that any use of the term "coupled to" is not intended to be limited to a direct connection between recited components, but also encompasses a disposition wherein there may be one or more intervening components or elements between the recited ones.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
receiving information, by a user equipment, from a first network element of a plurality of network elements, wherein the information is descriptive of a power reuse pattern utilized by the plurality of network elements;
identifying, using the received information, at least one frequency sub-band of a plurality of frequency sub-bands, wherein each network element of the plurality of network elements transmits at least one measurement signal in a channel on a frequency sub-band of the plurality of frequency sub-bands, wherein the measurement signals of the plurality of network elements are transmitted with different transmission powers,
wherein the identified at least one frequency sub-band corresponds to a second network element of the plurality of network elements, and is one on which the second network element transmits a measurement signal; and
performing at least one power measurement of the identified at least one frequency sub-band.

2. A method as in claim 1, wherein the received information is further descriptive of the at least one frequency sub-band corresponding to the second network element.

3. A method as in claim 2, wherein the information comprises a power reuse pattern identification that is descriptive of the power reuse pattern utilized by the plurality of network elements, the method further comprising: utilizing a mapping to obtain a corresponding power reuse pattern from the power reuse pattern identification.

4. A method as in claim 1, wherein identifying the at least one frequency sub-band corresponding to the second network element comprises utilizing system planning to determine the at least one frequency sub-band based on the power reuse pattern.

5. A method as in claim 1, further comprising: measuring a reception power of a plurality of second frequency sub-bands, wherein identifying the at least one frequency sub-band corresponding to the second network element comprises utilizing the plurality of measured reception powers.

6. A method as in claim 1, wherein the information is received via a broadcast signal transmitted by the first network element.

7. A method as in claim 1, wherein the first network element comprises a first base station and wherein the second network element comprises a second base station.

8. A method as in claim 1, wherein the plurality of network elements and the user equipment comprise components of an evolved universal terrestrial radio access network.

9. An apparatus, comprising:
a receiver configured to receive information from a first network element of a plurality of network elements, wherein the information is descriptive of a power reuse pattern utilized by the plurality of network elements; and
a data processor configured to identify, using the received information, at least one frequency sub-band of a plurality of frequency sub-bands, wherein each network element of the plurality of network elements transmits at least one measurement signal in a channel on a frequency sub-band of the plurality of frequency sub-bands, wherein the measurement signals of the plurality of network elements are transmitted with different transmission powers,
wherein the identified at least one frequency sub-band corresponds to a second network element of the plurality of network elements, and is one on which the second network element transmits a measurement signal;
wherein the data processor is further configured to perform at least one power measurement of the identified at least one frequency sub-band.

10. An apparatus as in claim 9, wherein the received information is further descriptive of the at least one frequency sub-band corresponding to the second network element.

11. An apparatus as in claim 9, wherein identifying the at least one frequency sub-band corresponding to the second network element comprises utilizing system planning to determine the at least one frequency sub-band based on the power reuse pattern.

12. An apparatus as in claim 9, wherein the data processor is further configured to measure a reception power of a plurality of second frequency sub-bands, wherein identifying the at least one frequency sub-band corresponding to the second network element comprises utilizing the plurality of measured reception powers.

13. An apparatus as in claim 9, wherein the information is received via a broadcast signal transmitted by the first network element.

14. An apparatus as in claim 9, wherein the apparatus comprises a user equipment.

15. An apparatus device as in claim 9, wherein the plurality of network elements and the apparatus comprise components of an evolved universal terrestrial radio access network.

* * * * *